(No Model.)
H. YOUNG.
ART OF SAWING STONE.
No. 364,458. Patented June 7, 1887.
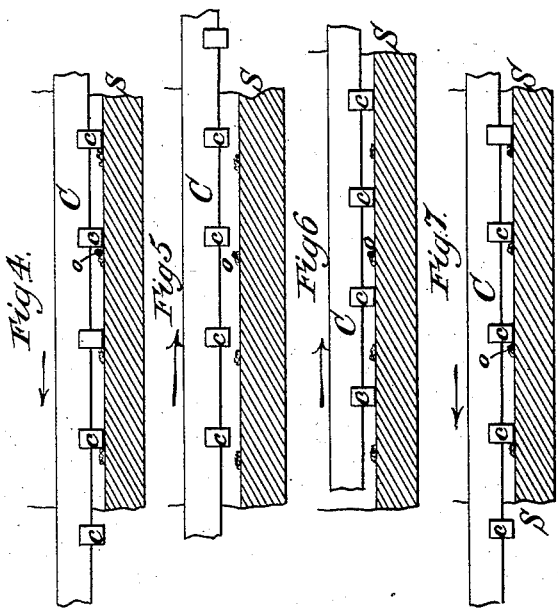
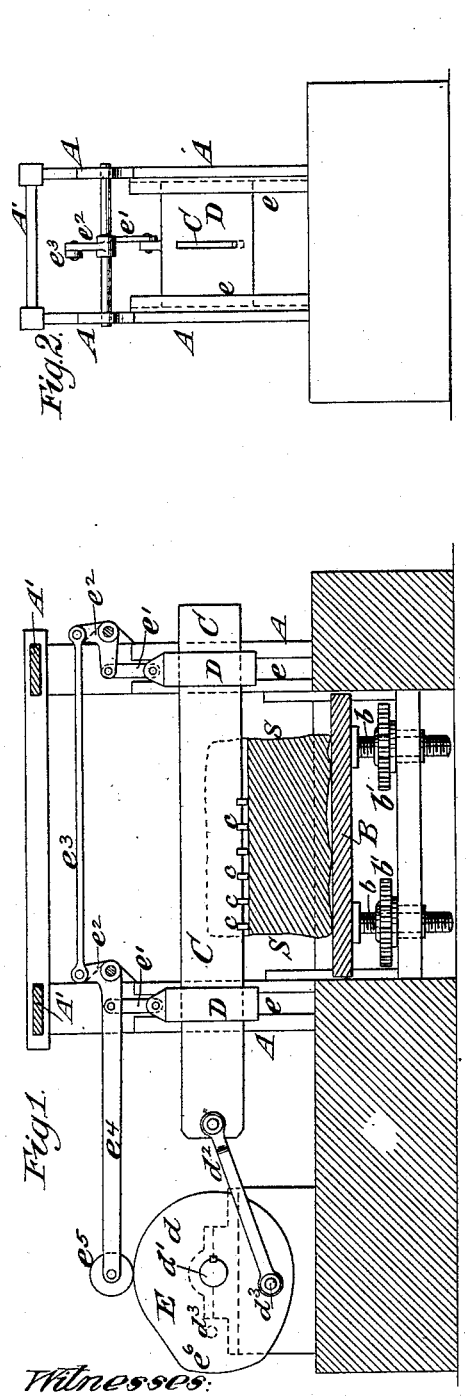
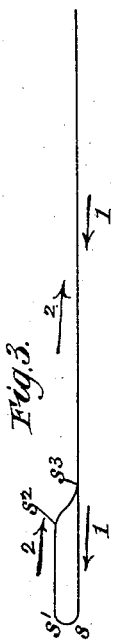
Witnesses:
O. L. Sundgren
Emil Kerte
Inventor:
Hugh Young
by his attys
Brown & Hall ature are gan.

UNITED STATES PATENT OFFICE.

HUGH YOUNG, OF NEW YORK, N. Y.

ART OF SAWING STONE.

SPECIFICATION forming part of Letters Patent No. 364,458, dated June 7, 1887.

Application filed February 9, 1887. Serial No. 227,071. (No model.)

*To all whom it may concern:*

Be it known that I, HUGH YOUNG, of the city and county of New York, in the State of New York, have invented a new and useful Improvement in the Art of Sawing Stone by a Reciprocating Series of Cutting-Tools, of which the following is a specification.

My invention is an improvement in the art of sawing stone which involves the employment of a series of tools consisting of or armed with diamonds or other hard stones secured in fixed relation to each other in a reciprocating blade or bar which is moved in the line of the cut to be made.

The first thought and practice as to reciprocating saws of this character was to have the saw cut both in its forward and backward stroke, and to maintain the tools in working-contact with the stone during the same length of movement in each direction; but the difficulties inherent in this method prevented its practical success. A great objection to such mode or method of working is that the débris is simply moved by the tools backward and forward in the kerf, and neither the débris nor any diamonds which may become freed from the blade have imparted to them any progressive movement to clear them out of the kerf. The débris which remains in the kerf, and is consequently ground back and forth by the tools, tends to wear away the setting of the diamonds, and, in so far as it covers the bottom of the kerf, it cushions and hinders the direct action of the cutters or tools on the stone to be cut. When a diamond becomes displaced from the blade, it usually and, indeed, so far as any provision to prevent is concerned, always remains in the kerf, to its own destruction and great damage to the undisturbed diamonds.

The object of my invention is to cause the diamonds or tools themselves, by the very method in which they are operated, to impart a progressive movement from one end of the stone to the other to all débris and loose diamonds or other bodies in the saw-kerf, and to thus "pump out" or deliver such débris and loose bodies at the end of the saw-kerf, and I accomplish such result while obtaining the maximum cutting effect of the diamonds or tools.

The important advantages and results above enumerated I secure by maintaining the cutting-tools in working-contact with the stone throughout a less length of movement in one direction than in the other direction, whereby each tool during the portion of its reciprocating movement which is made while the tool is out of working-contact is caused to vault or pass over and come behind the débris left by the preceding cut; and this difference in the length of working-contact is preferably substantially equal to the distance between two tools of the series.

The aforesaid improvement in the art of sawing stone by a reciprocating series of cutting-tools arranged in fixed relation to each other is the scope of my invention.

As the blade reaches or nears the end of its movement in one direction, I separate the tools from the bottom of the kerf by changing the relation of the blade and stone, as by lifting the blade, and the blade is caused to make a portion of its movement, preferably for a distance substantially equal to the distance between two cutting-tools, while the cutting-tools are out of working-contact with the stone, and then working-contact is re-established, as by lowering the blade to the stone, and is maintained throughout the remainder of the double stroke of the blade. By such operation of the blade its cutting-tools are each caused to vault or pass over and come behind the débris or loose bodies left in the kerf by the preceding cut, and at each double stroke of the blade the several piles of débris are moved ahead a distance about equal to the distance between two cutting-tools in the series, and an intermittent delivery of débris at the end of the stone is kept up.

In the accompanying drawings I have represented one form and construction of machine by which my invention may be carried out.

Figure 1 is a partly sectional elevation, and Fig. 2 is an end elevation, of such machine; but machines of other constructions may be employed for the purpose. Figs. 3, 4, 5, 6, and 7 are diagrams, all but Fig. 3 showing a stone and a blade armed with a series of cutting-tools, and which conduce to a clear understanding of the invention.

Similar letters of reference designate corresponding parts in all the figures.

A A' designate the frame of the machine, which may be of any suitable construction, and B designates a platform or table on which the stone S is supported while it is subjected to the cutting action of the series of diamonds or other suitable tools, $c$, set in or secured to the reciprocating blade C.

As the sawing progresses, the stone and blade must be gradually moved one toward the other to produce the necessary feed, and this result may be secured by gradually raising the table B by any suitable or well-known devices for the purpose—as, for example, by screws $b$ and ratchet-wheels $b'$. The blade C is reciprocated in blade bearers or guides D, and may be operated by suitable mechanism—as, for example, by a crank, $d$, on a shaft, $d'$, connected by a rod, $d^2$, with the blade. A rotary motion of the shaft $d'$, therefore, imparts a reciprocating motion to the blade.

An essential feature of my invention consists in separating the cutting-tools $c$ and stone S from working-contact at or near the end of movement of the blade C, and in maintaining the cutting-tools out of contact with the stone until the blade has made a portion of its movement—as, for example, a length of movement substantially equal to the distances between the cutting-tools. In this example of my invention I accomplish the desired result by moving the blade toward and from the stone. The guides or bearers D are each fitted to a slideway, $e$, in the frame A A', to provide for raising and lowering the blade. I have shown the guides or bearers as hung by links $e'$ from bell-crank levers $e^2$, which are connected by a rod, $e^3$, to move in unison, and one of such bell-crank levers is prolonged to form an arm or lever, $e^4$, carrying a roller, $e^5$, which bears against the periphery of a cam, E, on the shaft $d'$, as shown in Fig. 1.

In Fig. 3 I have by a diagram illustrated the line of movement of the blade. After the blade completes its movement in the direction indicated by the arrows 1, it is raised the distance from $s$ to $s'$, and in such raised position it commences its return movement in the direction indicated by the arrows 2, the blade making the portion of return movement from $s'$ to $s^2$ while in such raised position with its cutting-tools $c$ out of working-contact. While the blade is moving lengthwise from $s^2$ to $s^3$, it is lowered to bring its cutting-tools into working contact with the stone, and the remainder of its return movement in the direction of the arrows 2 is made with its cutting-tools in working-contact with the stone. The cam E has a projection, $e^6$, whereby the blade is raised to move the cutting-tools out of contact with the stone. When the crank-pin $d^3$ reaches the position indicated by dotted lines in Fig. 1, in which position it is on the dead-center, the projection $e^6$ of the cam E acts on the roller $e^5$ and lifts the blade and maintains the blade raised while the blade is moved in its return from $s'$ to $s^2$, Fig. 3, and then allows the cutting-tools to again make working-contact with the stone.

In Figs. 4, 5, 6, and 7 I have represented the stone and the blade in its several positions, and have also shown the piles of débris formed by the cutting-tools, and in one of which is a loose diamond, $o$. Fig. 4 represents the position of the blade when at the end of its movement toward the left and the first tool $c$ of the series has moved beyond the stone and thrown off or delivered from the stone the débris formed by it. Fig. 5 shows the position of the blade as it is moved back or toward the right and while its tools are out of working-contact, and Fig. 6 represents the blade C as moving still in the same direction, and after its tools have again come into working-contact with the stone, and Fig. 7 shows the position of the blade when it has again arrived at the end of its movement toward the left and just before it is raised.

By keeping the tools out of working-contact or raised while making a portion of the movement of the blade toward the right, each tool is caused to vault over the pile of débris left by the preceding cut and to come down into working-contact with the stone behind such pile, and at each movement of the tools toward the left hand each tool moves toward the left its own débris, and also that which was before formed by the tool preceding it in the series. The diagrams represent the way in which the loose diamond $o$ is advanced toward the left of the figures by the repeated operations of the cutting-tools in the manner described, and the débris is advanced in the same way, and any loose substance whatever in the saw-kerf will be given a progressive movement toward the left hand and delivered at the end of the stone. By this method of operation the settings of the tools in the blades will not become rapidly worn away, and the tools will not become detached, and will act more effectively than when the débris is simply moved back and forth in the cut without having imparted to it a progressive movement toward the end of the cut.

To carry out my invention, it is only necessary that the difference between the length of the working-contact of the tools while moving in opposite directions, or, in other words, the distance during which the tools are out of contact with the stone, be sufficient to enable each tool to vault or pass over and come behind the débris left in the kerf by that tool, or one adjacent to it, in the previous cut, and hence to accomplish practical results it is not necessary that the difference in working-contact be equal to the distance between two tools. In practice, however, I now believe it will usually be desirable to make such difference slightly greater than or substantially equal to such distance.

Instead of the tools being in working-contact until they reach the end of their movement toward the left, as supposed in describing Fig. 3, such contact may be broken at the point $s^3$ while the tools are moving in the direction of the arrows 1, and each cutting-tool would then describe the path $s^3$ $s^2$ $s'$ $s$ and will be in working-contact at the commencement of its movement toward the right. To secure this operation, it is only necessary to change the cam E.

I do not here claim specifically the improvement in the art of sawing stone by a reciprocating series of cutting-tools arranged in fixed relation to each other, consisting in maintaining the tools in cutting-contact with the stone during substantially the whole length of their movement in one direction and maintaining them out of cutting-contact during both the first and terminal portions of their movement in the other direction, whereby, during the first and terminal portions of their movement in one direction, the tools are caused to vault over and come behind the débris in the kerf, in order that they may, in their movement in the other direction, advance the débris in the kerf, inasmuch as such improvement forms the subject-matter of my application Serial No. 230,204, filed March 9, 1887.

What I claim as my invention, and desire to secure by Letters Patent, is—

1. The improvement in the art of sawing stone by a reciprocating series of cutting-tools arranged in fixed relation to each other, consisting in maintaining the tools in working-contact with the stone throughout a less length of movement in one direction than in the other, whereby each tool, during the portion of its reciprocating movement which is performed while it is out of working-contact, is caused to vault over and come behind the débris formed by the previous cut, substantially as and for the purpose herein described.

2. The improvement in the art of sawing stone by a reciprocating series of cutting-tools arranged in fixed relation to each other, consisting in maintaining the tools in working-contact with the stone throughout a less length of movement in one direction than in the other direction, the difference in the length of working-contact being substantially equal to the distance between two tools in the series, as and for the purpose herein described.

HUGH YOUNG.

Witnesses:
C. HALL,
FREDK. HAYNES.